E. R. DEVLIN.
NONSKID DEVICE.
APPLICATION FILED APR. 8, 1921.
1,412,344.
Patented Apr. 11, 1922.
2 SHEETS—SHEET 1.
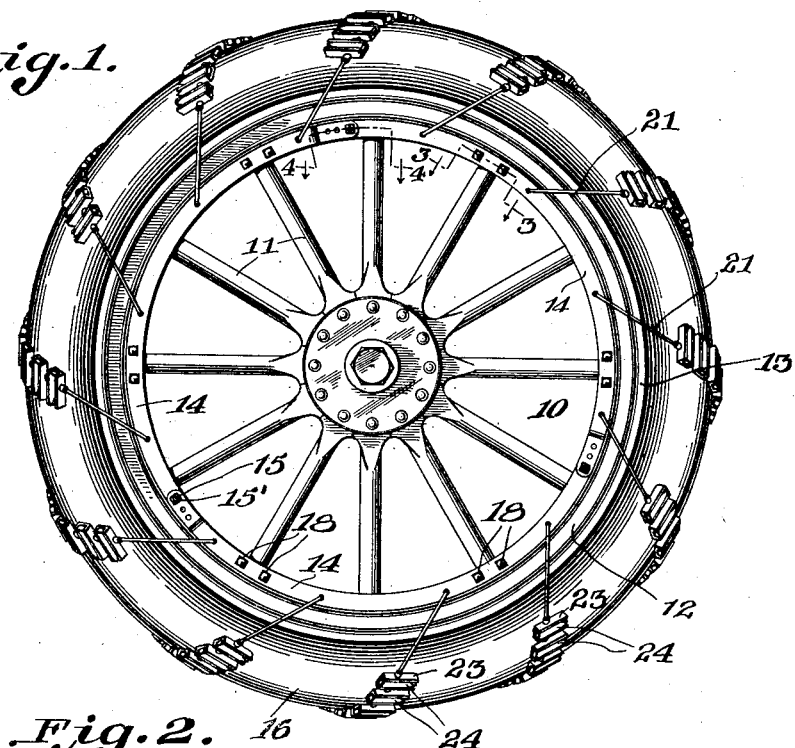
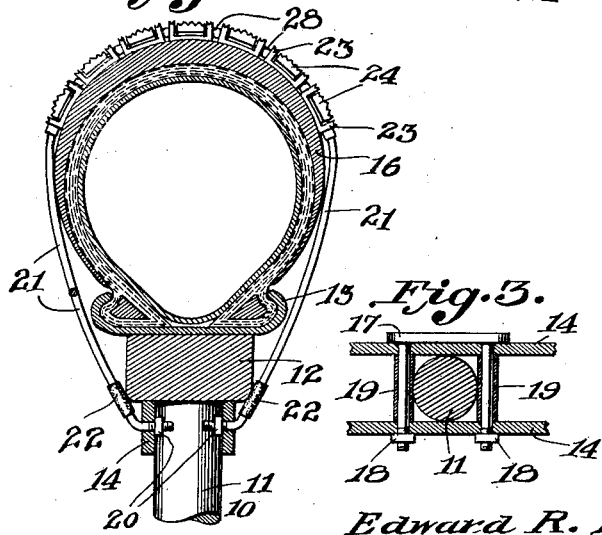
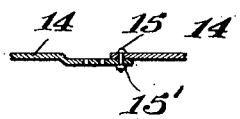
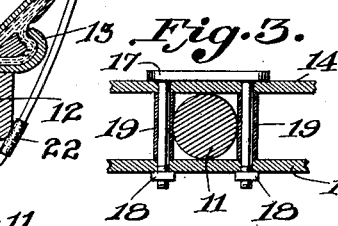
Edward R. Devlin INVENTOR.
BY
Cushman, Bryant Darby
ATTORNEY.

E. R. DEVLIN.
NONSKID DEVICE.
APPLICATION FILED APR. 8, 1921.
1,412,344.
Patented Apr. 11, 1922.
2 SHEETS—SHEET 2.
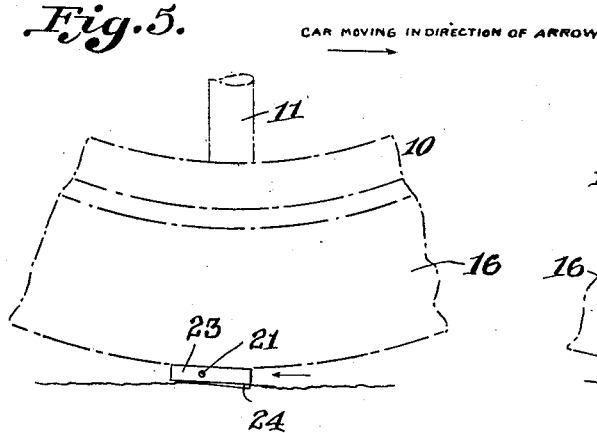
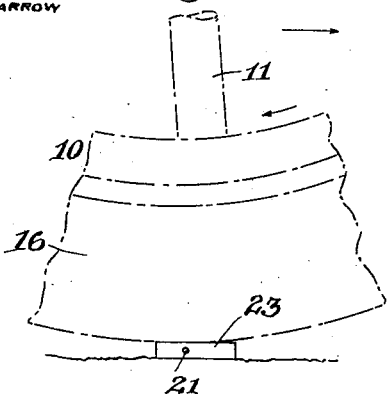
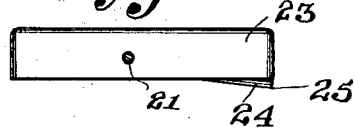
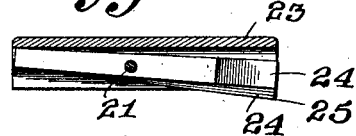
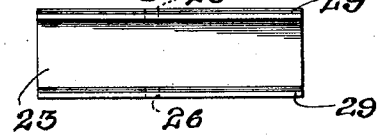
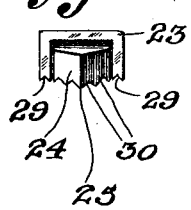
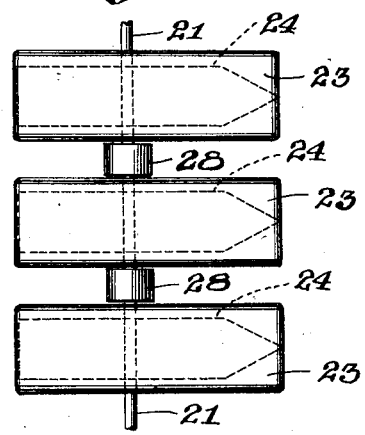
Edward R. Devlin
INVENTOR.
BY
Cushman Bryant Warby
ATTORNEY.

UNITED STATES PATENT OFFICE.

EDWARD R. DEVLIN, OF NEWTON CENTER, MASSACHUSETTS.

NONSKID DEVICE.

1,412,344.  Specification of Letters Patent.  Patented Apr. 11, 1922.

Application filed April 8, 1921. Serial No. 459,563.

*To all whom it may concern:*

Be it known that I, EDWARD R. DEVLIN, a citizen of the United States, residing at Newton Center, in the county of Middlesex and State of Massachusetts, have invented new and useful Improvements in Nonskid Devices, of which the following is a specification.

This invention relates to improvements in anti-skidding and snow shoe attachments for vehicle wheels and is designed to provide devices which may be readily and conveniently applied to a vehicle wheel, so that, when the motion of the wheel is arrested, the anti-skidding device will quickly and effectively stop movement of the car even on a smooth slippery surface, such as glare ice and the like.

One important object of the invention is to provide a non-skid attachment which will not cut up and injure the road surface when in use, and which is adapted, furthermore, to fit snugly about and against the surface of the tire.

I accomplish the results aimed at by providing an anti-skidding device, comprising an inverted U-shaped block member, to which is movably secured a ground engaging shoe having an inclined lower wall, deeper at its forward end, the said block and the shoe having apertures in the sides therein, away from the longitudinal center and towards the rear, for the purpose of receiving a flexible member which adjustably secures them to the wheel, the receiving apertures for such flexible members being so located that when the motion of the vehicle is arrested the forward end of the shoe is forced into contact with the ground.

In order that the invention may be clear, I have shown in the accompanying drawings, one embodiment thereof, and in said drawings:

Figure 1 is a side elevation of the wheel having the improved non-skid device attached thereto.

Figure 2 is a transverse section through the wheel and the tire to illustrate the application of the device.

Figure 3 is a detail section on substantially the line 3—3 of Figure 1.

Figure 4 is a detail section on substantially the line 4—4 of Figure 1.

Figures 5 and 6 are side views of the wheel and anti-skidding device in operative and inoperative positions respectively.

Figure 7 is a side view of the block and shoe on an enlarged scale.

Figure 8 is a longitudinal section of the block and shoe on an enlarged scale.

Figure 9 is a bottom plan view of the block on an enlarged scale.

Figure 10 is a bottom plan of the ground engaging shoe on an enlarged scale.

Figure 11 is a front end view of the block and shoe members as shown in Figure 8.

Figure 12 is a top plan view of a part of the anti-skidding device, showing the position of the spacer members.

In the drawings, where, for the purpose of illustration, is shown the preferred embodiment of the invention, the numeral 10 designates the vehicle wheel, having a plurality of spokes 11, which have a felly 12 connected thereto, a rim 13 being arranged about the felly 12 for detachably securing the tire 16 to the wheel.

The improved non-skid device forming the subject matter of this application, embodies a pair of inner rim members 14 located on each side of the wheel adjacent the felly, said inner rim members being preferably formed in a plurality of sections, whose overlapping ends are adjustably secured by bolts 15 and nuts 15'. These members 14 are so formed as to adapt themselves to any size of wheel within wide limits, to which they may be applied. Suitable fastening means, as, for example, U-shaped bolts 17 and nuts 18, located on each side of the spokes 11, secure the inner rim members together, as best shown in Figure 3. The arms of the bolts 17 are prevented from scratching or otherwise marring the felly or spokes of the wheel by buffer tubes 19 attached to the arms.

The improved non-skid and snow shoe device forming the subject matter of this application embodies a flexible member, such as a cable or wire 21. Secured at its ends to the inner rim members by nuts 20, is a flexible member 21, which may be a cable or wire, buffer tubes 22 being attached to said cable for preventing scratching of the felly, 12. Carried by member 21 are a plurality of U-shaped metal blocks 23 in each of which is pivotally mounted ground-engaging shoe members 24, said blocks and shoe members having apertures 26 and 27 in their sides located somewhat away from the longitudinal center and towards the rear end thereof. Said blocks and shoe members are separated by spacer members 28 threaded alternately with them on the flexible member 21 so as to connect them to the inner rims 14 of the wheel. While the spacer members 28 are shown as separate members, it will be obvious that they may, if desired, be formed integral with the carrier blocks. The ground engaging shoe member 24 is slightly thickened at its forward end, as best shown in Figures 8 and 9, said thickened forward end terminating in a point 25.

Longitudinal corrugations 29 and 30 are formed in the ground engaging faces of the blocks 23 and shoes 24 to prevent side slipping of these members, as best shown in Figure 11.

In the embodiment of my invention here shown, I employ a series of non-skidding members, seven being shown, diagonally arranged across the wheel so as to present a greater contacting area or surface with the ground; however, the number of the devices used may be varied.

The operation of my device is as follows: While the wheel revolves freely, the non-skidding devices present no interference with its action, nor do they affect its resiliency. When the motion of the wheel is arrested, as by the application of the brake, the immediate effect is to push backward those of the non-skid devices which are in contact with the ground, causing the tilting of the devices, and particularly of the shoes 24, so that the front or sharpened end 25 of the ground engaging shoe will drop down and engage the ground with a wedging action, thus stopping the movement of the car, as illustrated in Figure 6. It will be observed that in addition to the action of the shoes 24 in tilting to the position shown in Figure 8 and resting in a skidding tendency, that the corrugated contacting face of the shoes will effectually prevent any side slip or skid by reason of the engagement of the plurality of projections with the ground.

When it is desired to detach any of the blocks or shoes for repair or replacement, it is merely necessary to remove one of the nuts 19 from the end of the flexible member 21, remove it from the inner rim members 14, and slip blocks and shoes off. The cables 21, by means of the threaded end portions and nuts 20, are at all times securely and adjustably fastened to the wheel.

It is to be understood that while the form of the invention herein shown and described is a preferred embodiment of my invention, such changes in the construction and arrangement of parts as are mere mechanical variations, may be made without departing from the range of my invention as defined in the accompanying claims.

I claim:

1. In an anti-skidding device, the combination of a plurality of ground engaging members; means for securing said members to a wheel; and a pivotal connection between said members and said securing means, off-centered intermediate its ends with respect to said securing means, to insure tilting of said member and engagement of the front end thereof with the ground when the motion of the wheel is arrested.

2. In an anti-skidding device, the combination of a plurality of carrier blocks; ground engaging members mounted on said blocks; means for securing said blocks and members to a wheel; and an off-centered pivotal connection between said securing means, said blocks, and ground engaging members, to insure tilting of said ground engaging members and engagement of the front ends thereof with the ground when the motion of the wheel is arrested.

3. In an anti-skidding device, the combination of a flexible member adapted to be secured to a wheel; a plurality of substantially U-shaped carrier blocks pivotally mounted on said flexible securing means, and ground engaging members housed in said carrier blocks and pivotally mounted on said flexible securing means; the pivotal connection of said securing means, carrier blocks and ground engaging members being off-centered with respect to said blocks and ground engaging members, to insure tilting of said members and engagement of the front ends thereof with the ground when the motion of the wheel is arrested.

4. In an anti-skidding device, the combination of a plurality of substantially U-shaped carrier blocks, ground engaging shoes housed in said blocks, and flexible means movably securing the blocks and shoes to the wheel.

5. In an anti-skidding device, the combination of a plurality of substantially U-shaped carrier blocks, ground engaging shoes having thickened forward ends housed in said blocks, and flexible securing means threaded through said blocks and shoes nearer one end thereof than the other to provide an off-centered pivotal connection.

6. In an anti-skidding device, the combination of a plurality of substantially U-shaped carrier blocks, tapered ground engaging shoes housed in said blocks and having pointed forward ends, and flexible securing means threaded through said blocks and shoes nearer one end thereof than the other to provide an off-centered pivotal connection.

7. In an anti-skidding device, the combination of a plurality of substantially U-shaped carrier blocks, tapered ground engaging shoes having pointed ends and corrugated contact faces housed in said blocks, and flexible securing means threaded through said blocks and shoes nearer one end than the other to provide an off-centered pivotal connection.

8. In an anti-skidding device, the combination of a plurality of substantially U-shaped carrier blocks; ground engaging shoes housed in said blocks; spacers between said blocks; and flexible means threaded through said blocks, shoes and spacers nearer one end of said blocks and shoes than the other to provide an off-centered pivotal connection.

9. A ground shoe for anti-skid devices having a longitudinal thickened and pointed forward end and provided with longitudinal corrugations on its contact face.

10. A ground engaging member for anti-skid devices, comprising an independent recessed carrier block, and a ground engaging shoe mounted in said recessed block and having an off-centered pivotal connection therewith.

11. A ground engaging member for anti-skid devices, comprising an independent recessed carrier block; and a tapering, pointed shoe mounted in said recessed block and having an off-centered pivotal connection therewith.

In testimony whereof I have hereunto set my hand.

EDWARD R. DEVLIN.